UNITED STATES PATENT OFFICE.

GEORGE THOMPSON, OF EAST TARENTUM, PENNSYLVANIA.

IMPROVEMENT IN THE MANUFACTURE OF CAUSTIC ALKALI.

Specification forming part of Letters Patent No. 15,957, dated October 21, 1856; reissue No. 654, dated February 1, 1859; reissue No. 2,569, dated April 16, 1867.

DIVISION A.

*To all whom it may concern:*

Be it known that I, GEORGE THOMPSON, late of East Tarentum, county of Allegheny, State of Pennsylvania, have invented a new and useful Improvement in the Manufacture of Caustic Alkalies; and I do hereby declare that the following is a full, clear, and exact description thereof.

My invention consists in a new article of manufacture, viz., caustic alkalies (soda or potassa) inclosed in an integument of impervious, anti-corrosive fabric, thus forming a new article of commerce and manufacture, which may be preserved and transported, and thus introduced into general use for domestic and other purposes where those concentrated alkalies, owing to their peculiar chemical properties, were not, prior to my invention, susceptible of such preservation, transportation, and use.

Hydrate of soda and potassa, commonly known as caustic soda and potash, would prove very useful for domestic and other purposes; but, owing to the fact that they speedily deliquesce after being exposed even for a short time to the action of atmospheric air, and that by their caustic property they attack and destroy almost everything with which they are allowed to come in contact in their deliquescent state, it has been found practically impossible to manufacture these articles in a condition fit for preservation and transportation for family and other uses.

I have discovered that an integument can be prepared of muslin, paper, or other similar fabric, by immersing it in a preparation of bees-wax and rosin, or melted tar and rosin, or other similar substance, which will be alike incorrodible by the alkali, and will, by its imperviousness to moisture, prevent its deliquescence and destruction; and that, if caustic alkali be incased or united with such a prepared fabric as an integument, a new and valuable article of manufacture and commerce will be produced. The cakes of caustic soda or potash, so soon as they are sufficiently solid to bear handling, are immediately folded up carefully in the wrapping thus prepared, the sticky nature of the substance with which the wrapping is impregnated causing it to adhere together where the edges fold over each other, and thus serving to exclude entirely the air and moisture from obtaining access to the cake of caustic alkali within. The package thus wrapped may then, for further protection, be immersed in the same preparation used for preparing the wrapping fabric, which gives it a uniform coating all over, and covers up any opening which may exist in the folds of the wrapping. When thus wrapped and prepared, an exterior coating of common paper is added, for cleanliness and convenience of handling and packing, and the packages are then ready for sale, and may be kept without injury to the alkali for almost any length of time. When used for making soap, the inner covering of prepared paper need not be removed, as the small quantity of rosin and bees-wax will not injuriously affect the soap. It may be readily removed, however, if preferred.

Having thus described my invention, what I claim as new, and desire to secure by Letters Patent, as a new article of manufacture, is—

Caustic alkali inclosed in an integument or casing of anti-corrosive, impervious fabric, substantially as above described.

GEORGE THOMPSON.

Witnesses:

GEO. E. BUCKLEY,

J. E. SHAW.